United States Patent
Veselic et al.

(10) Patent No.: US 7,034,503 B2
(45) Date of Patent: *Apr. 25, 2006

(54) CIRCUIT AND METHOD OF OPERATION FOR AN ADAPTIVE CHARGE RATE POWER SUPPLY

(75) Inventors: Dusan Veselic, Oakville (CA); Michael F. Habicher, Waterloo (CA); Jacek S. Idzik, Kenilworth (CA); Jonathan T. Malton, Kitchener (CA)

(73) Assignee: Research In Motion Limited, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/965,331

(22) Filed: Oct. 14, 2004

(65) Prior Publication Data

US 2005/0046391 A1 Mar. 3, 2005

Related U.S. Application Data

(63) Continuation of application No. 10/372,446, filed on Feb. 21, 2003, now Pat. No. 6,833,686.

(51) Int. Cl.
*H01M 10/46* (2006.01)
(52) U.S. Cl. ..................................... 320/128
(58) Field of Classification Search ............... 320/128, 320/132, 133, 160, 164
See application file for complete search history.

(56) References Cited

U.S. PATENT DOCUMENTS

| | | | |
|---|---|---|---|
| 3,775,659 A | 11/1973 | Carlsen, II | |
| 4,433,251 A | 2/1984 | Banks et al. | |
| 4,443,752 A * | 4/1984 | Newman | 320/152 |
| 4,510,431 A | 4/1985 | Winkler | |
| 5,173,855 A | 12/1992 | Nielsen et al. | |
| 5,229,649 A | 7/1993 | Nielsen et al. | |
| 5,272,475 A | 12/1993 | Eaton et al. | |
| 5,444,378 A | 8/1995 | Rogers | |
| 5,631,503 A | 5/1997 | Cioffi | |
| 5,638,540 A | 6/1997 | Aldous | |
| 5,651,057 A | 7/1997 | Blood et al. | |
| 5,723,970 A | 3/1998 | Bell | |
| 5,769,877 A | 6/1998 | Barreras, Sr. | |
| 5,850,113 A | 12/1998 | Weimer et al. | |
| 5,939,860 A | 8/1999 | William | |
| 6,104,162 A | 8/2000 | Sainsbury et al. | |
| 6,104,759 A | 8/2000 | Carkner et al. | |
| 6,362,610 B1 | 3/2002 | Yang | |
| 6,507,172 B1 | 1/2003 | Sherman | |
| 6,507,173 B1 | 1/2003 | Spiridon et al. | |
| 6,522,118 B1 | 2/2003 | Barcelo et al. | |
| 6,531,845 B1 | 3/2003 | Kerai et al. | |
| 6,626,703 B1 | 9/2003 | Hsin | |
| 6,833,686 B1 * | 12/2004 | Veselic et al. | 320/128 |
| 2002/0130638 A1 | 9/2002 | Sherman | |

OTHER PUBLICATIONS

Linear Technology; LTC4056-4.2, "Linear Li-Ion Charger with Termination in ThinSOT," Apr. 2003, pp. 1-16, USA.
Linear Technology; LTC4053-4.2, "USB Compatible Lithium-Ion Battery Charger with Thermal Regulation," 2001, pp. 1-16, USA.
Supercapacitor: Electric Double-Layer Capacitors, vol. 2, Oct. 25, 1996 (Japan, Tokin Corp., Cat. No. EC-200E).
Supercapacitor: User's Manual, vol. 2 (Japan, Tokin Corp., date unknown).
Charging Big Supercaps, Portable Design, p. 26, Mar. 1997.

* cited by examiner

*Primary Examiner*—Edward H. Tso
(74) *Attorney, Agent, or Firm*—Brij K. Agarwal; Philip E. Levy; Eckert Seamans Cherin & Mellott, LLC

(57) ABSTRACT

A convenient source of charging power for portable communication devices is an integral power node of a computer data bus, such as a USB (universal serial bus) port. Unfortunately, USB ports have limited power capacity, making them generally incompatible with battery charge controllers (BCCs) which are designed to receive a steady, high capacity input. The invention provides a battery charging circuit which adjusts to the parameters of an external power supply such as a USB port by adding a regulating circuit to a standard BCC design. This regulating circuit maximizes the current drawn by the BCC, while keeping the voltage to the BCC above a preset minimum (the low voltage shut off level for the BCC). If the voltage to the BCC begins to drop, the regulating circuit reduces the current drawn, so the voltage rises and stays within the operating range of the BCC.

15 Claims, 4 Drawing Sheets

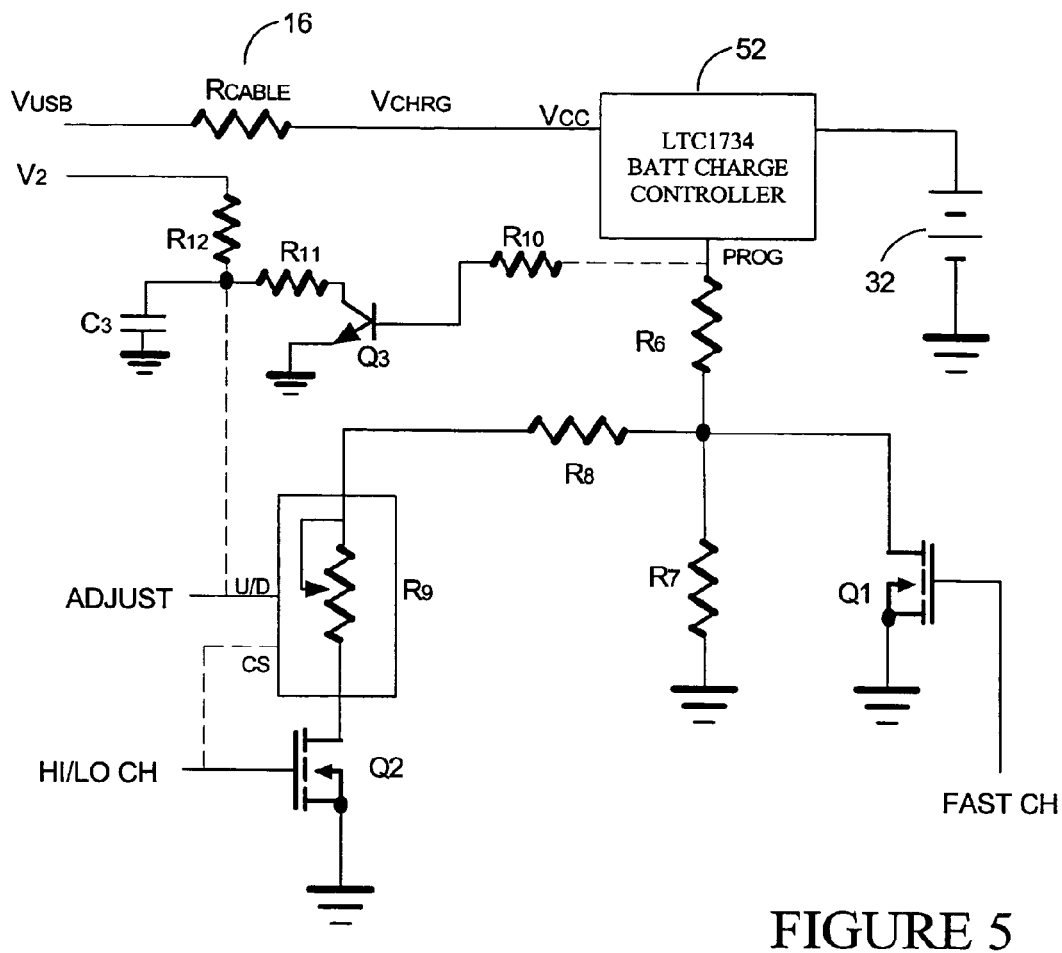
FIGURE 5
FIGURE 6
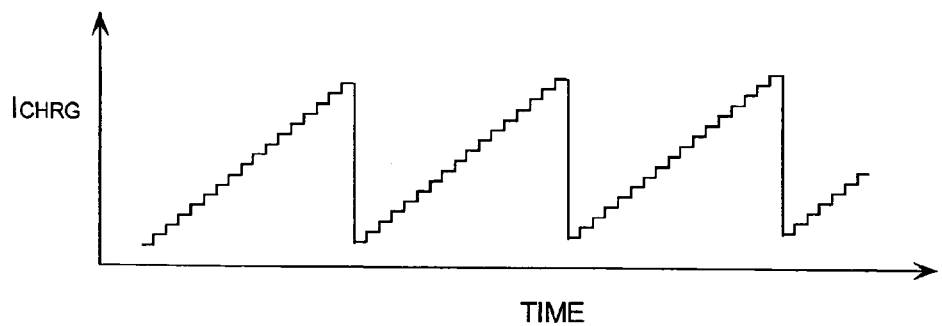

CIRCUIT AND METHOD OF OPERATION FOR AN ADAPTIVE CHARGE RATE POWER SUPPLY

CROSS-REFERENCE TO RELATED APPLICATION

This application is a continuation of U.S. application Ser. No. 10/372,446, filed on Feb. 21, 2003 now U.S. Pat. No. 6,833,686 and entitled "Circuit and Method of Operation for an Adaptive Charge Rate Power Supply." The entire specification of that application, including the drawing figures, is hereby incorporated into the present application by reference.

This invention relates in general to battery chargers, and more specifically to a method and apparatus for charging a battery in a portable communication device from a variety of power sources, including limited capacity sources such as an integral power node of a computer data bus. One such computer data bus would be a USB (universal serial bus) port.

BACKGROUND OF THE INVENTION

With the current computing and information revolution, portable electronic devices such as cellular telephones, personal digital assistants (PDAs), digital pagers and wireless email devices, are becoming very common.

These portable devices are typically powered by internal batteries which must be recharged periodically by an external power source, using a battery charger. Battery chargers generally receive power from a standard AC electrical outlet and convert the AC power into a low DC voltage for recharging a battery.

The battery chargers of these portable devices also generally employ a "battery charge controller" to manage the charging of the battery. Such battery charge controllers offer functionality such as:

- regulating the voltage and current levels to the rechargeable battery;
- providing status signals to the main processor of the portable device, or operating one or more status LEDs (light emitting diodes);
- providing protection circuits such as overcurrent, undervoltage, and overtemperature protection; and
- shutting themselves off when the charging source has been removed, to minimize battery drain.

Unfortunately, most of these battery charge controllers are designed to draw from a high capacity power supply with a steady voltage that will not sag appreciably under its current demands. This is a problem when one attempts to use a power supply with limited capacity or when the power is delivered via unknown length and gauge of power wires (the resistance of such power wires cause a voltage drop which aggravates the problem). Some computer data buses such as USB (universal serial bus) buses can be used to provide power to external devices, but while such power supplies are very convenient, they have limited capacity and are delivered via standard USB cables whose power wires could vary in length and gauge (anywhere from 20 AWG–28 AWG, for example).

The majority of personal computers (PCs) and laptop computers available today, are provided with one or more USB ports as standard components. USB ports are designed to support data communication at speeds of 12 megabits and 1.5 megabits per second (USB 2.0 provides for up to 480 megabits per second), support PnP (Plug and Play) installation software, and support hot plugging (i.e. devices can be connected and disconnected while the PC is running). Thus, USB ports are often used as interfaces to connect keyboards, mouses, game controllers, printers and scanners to PCs.

As well, USB ports are able to supply limited power to a connected device. The standard USB specification requires that "high-power" USB ports be operable to provide a supply voltage of 4.75–5.25 VDC and supply a maximum current of at least 500 mA (five units). The specification for "low-power" USB ports requires a supply voltage of 4.40–5.25 VDC and current of 100 mA (one unit).

USB ports would seem to be a very logical choice as a power supply for portable devices for a number of reasons. To begin with, USB ports supply a low DC voltage supply which is often very close to, or just above, the voltage of the battery being charged (many portable devices having battery voltages in the range of 2.5–4.5 VDC.) As well, many portable devices may be operable to upload and download data or software, to and from a personal computer or a laptop computer (often referred to as "syncing.") Thus, may portable devices are supplied with docking cradles as shown in the system diagram of FIG. 1. This is quite a straightforward system as the docking cradle 10 is connected to a USB port 12 of a personal computer (PC) 14, via a simple USB cable and connectors 16. The mobile device 18 need only be placed into the docking cradle 10 and an electronic connection to the (PC) 14, is made.

If the USB port 12 has sufficient power, it makes much more sense to use the USB port 12 to supply charging power to the mobile device 18, rather than using a separate AC charger. For example:

- a USB power supply will have less electrical noise than an AC charger, unless the AC charger incorporates large DC capacitors or inductors;
- an AC charger requires either a heavy transformer or an expensive switching power supply current, neither of which would be required if USB power is used;
- in the USB power supply implementation, the cable and connectors 16 used to connect the docking cradle 10 to the PC 14 could be used to carry both power and data, so no extra physical components would be required at all. In contrast, an AC power supply would have to be provided as a separate physical component, and
- a given AC power supply may require 120VAC or 240VAC as an input, and may provide 3, 4.5, 6, 7.5 or 9 VDC out, with one of a large number of different possible connectors and polarities. A traveler who forgets an AC power supply at home, may not be able to find a replacement.
- In contrast, the USB standard is widely accepted, so that a traveller whose mobile device is equipped with a USB connector will have a much greater chance of finding a charging source.

Unfortunately, USB ports can only provide limited power, while typical battery charge controllers are designed to receive a steady, high capacity power supply (that is, the input voltage at the battery charge controller is at or near its designed value, and does not drop as charging current increases.) The problem becomes clear when considering the block diagram of FIG. 2. The components of FIG. 2 are the same as those of FIG. 1, specifically, a docking cradle 10 powered from a USB port 12 of a PC 14, via cable and connectors 16, and feeding a portable device 18 resting in the cradle 10. From this presentation, it is clear that the voltage output from the USB port 12, $V_{UBS}$, will drop as it crosses the cable and connectors 16, due to its resistance, $R_{CABLE}$. If either the cable resistance ($R_{CABLE}$) or the current drawn ($I_{CABLE}$) is too great, the voltage arriving at the battery charge controller in the mobile device 18, may be too low. This low voltage will cause many standard battery charge controllers to either shut down or to oscillate and fail to charge the battery in the portable device 18 efficiently.

True, new dedicated battery charge controllers could be developed which are operable with the limited USB power supply and resistance of the cable and connector system, but that would be an expensive and complicated solution. Such a design would become even more complicated to be compatible with both computer data bus power supplies and other power sources, such as AC power supplies.

There is therefore a need for a method and apparatus which allows standard battery charge controllers to be supplied with power from standard computer data busses such as USB ports. This design must be provided with consideration for the cost of electrical components, the limited physical board area in portable devices, the reliability and the complexity of the design. It is also desirable that this method and apparatus be operable with both computer data bus power supplies, and other power sources such as AC power supplies.

SUMMARY OF THE INVENTION

It is therefore an object of the invention to provide a novel method and apparatus which allows standard battery charge controllers to be supplied from standard computer data ports and other power sources, which obviates or mitigates at least one of the disadvantages of the prior art.

One aspect of the invention is broadly defined as a battery charging circuit which adjusts to the parameters of an external power supply, to minimize charge time, comprising: a battery charge controller connected to the external power supply and electrifying a battery; and a regulating circuit for maximizing the current drawn by the battery charge controller, while keeping the voltage to the battery charge controller above a preset minimum limit, the preset minimum limit corresponding to a low voltage shut off level for the battery charge controller.

Another aspect of the invention is broadly defined as a method for charging a battery of a portable device via an external power supply, which adjusts to the parameters of the external power supply to minimize charge time, the method comprising the steps of: connecting a battery charge controller to the external power supply and to a rechargeable battery in the portable device; determining a low voltage shut off level for the battery charge controller; monitoring the voltage that the external power supply provides to the battery charge controller; and maximizing the current drawn by the battery charge controller, while keeping the voltage to the battery charge controller above the low voltage shut off level for the battery charge controller.

BRIEF DESCRIPTION OF THE DRAWINGS

These and other features of the invention will become more apparent from the following description in which reference is made to the appended drawings in which:

FIG. 5 presents an electrical schematic diagram of a battery charging circuit using an electronic potentiometer, in an embodiment of the invention;

FIG. 6 presents a timing diagram of charging current provided by the embodiment of FIG. 5.

DESCRIPTION OF THE INVENTION

The general problem addressed by the invention is that typical battery charge controllers are designed to received a steady, high capacity power supply while such a power supply is often unavailable, or is simply inconvenient. One of the most common battery charge controllers, for example, the LTC1734 from Linear Technology Corporation is designed to receive 5 VDC in, and has a low voltage lockout at 4.53V (that is, if the LTC1734 receives a supply voltage of less than 4.53 VDC, it simply shuts down.) When the voltage drop across the supply cable and connectors 16 are considered, the voltage supplied by the power node of a data bus such as a USB port, may be lower then this low voltage lockout. Therefore, though the LTC1734 is widely available, inexpensive and reliable, it cannot be used effectively in this environment.

Figure 1:
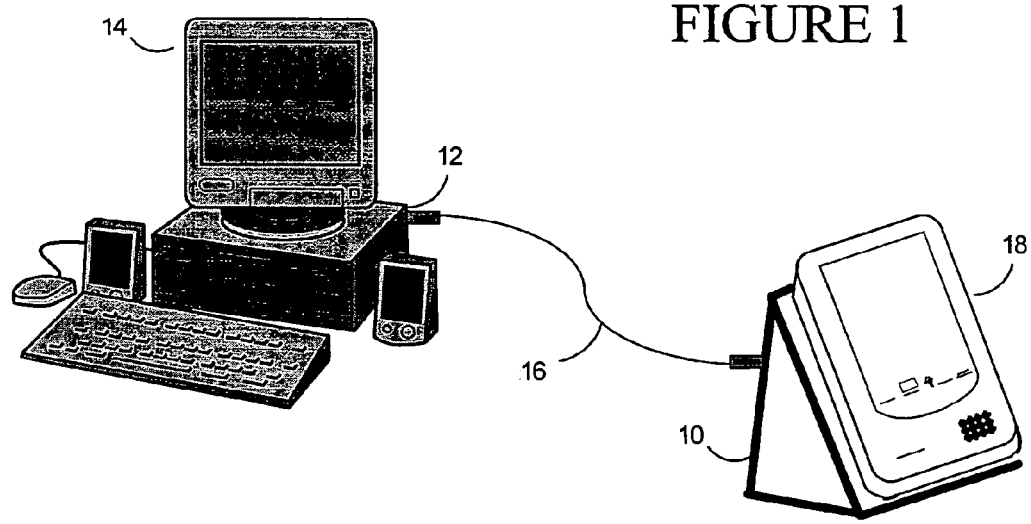
FIG. 1 presents a physical layout of a personal computer connected to a portable electronic device in a manner known in the art.
Figure 2:
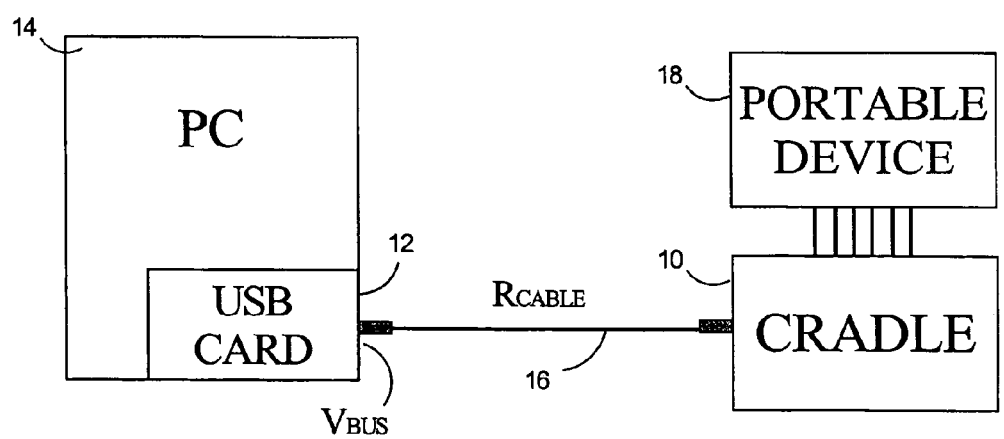
FIG. 2 presents a block diagram of the system presented in FIG. 1, highlighting the problem of voltage drop between the personal computer and the portable electronic device.
Figure 3:
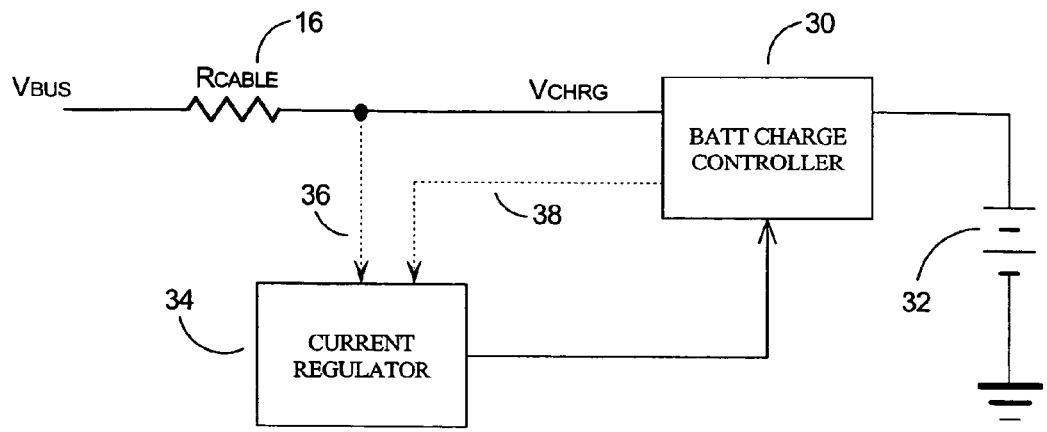
FIG. 3 presents a electrical schematic diagram of a battery charging circuit in a broad embodiment of the invention.

A circuit which overcomes this problem, is presented as a block diagram in FIG. 3. This figure presents a battery charging circuit which uses a standard battery charge controller 30 known in the art, coupled to a rechargeable battery or batteries 32. The battery charge controller 30 is provided with power from some manner of external power, such as a computer data bus. This power connection is presented in FIG. 3 in the form of input voltage $V_{BUS}$. This $V_{BUS}$ voltage will be reduced due to the resistance of the electrical cable and connectors 16, $R_{CABLE}$. Thus, the battery charge controller 30 only receives a voltage of $V_{CHRG} = V_{BUS} - (R_{CABLE} \times I_{CABLE})$.

As will be explained in greater detail hereinafter, the voltage drop across $R_{CABLE}$ may result in the $V_{CHRG}$ voltage being lower than the low voltage threshold for the battery charge controller 30. The invention therefore adds a current regulator 34 to the circuit. The resistance $R_{CABLE}$ is of course fixed, but by reducing the current drawn by the battery charge controller 30, $I_{CABLE}$, the voltage drop across $R_{CABLE}$ will decrease, thus avoiding the low voltage shut off of the battery charge controller 30, and allowing the battery 32 to be charged.

A number of current regulators 34 are described herein, but in general it desirable that the current regulator:

maximize the current being fed to the battery 32, and therefore maximizing the current drawn from the power supply ($I_{CABLE}$), while keeping the $V_{CHRG}$ voltage greater than the low voltage shut off level of the battery charge controller 30.

In some embodiments of the invention the current regulator 34 uses $V_{CHRG}$ as an input (via connection 36), while in other embodiments the current regulator 34 uses an output of the battery charge controller 30 (via connector 38). Still other embodiments use no feedback to the current regulator 34.

Say, for example, that the voltage provided from the computer data bus is 4.75–5.25 VDC; that is, $V_{BUS}$=4.75–5.25 VDC; the circuit must therefore be designed to operate at $V_{BUS}$=4.75 VDC. Suppose also that the resistance of the cable and connectors 16 is 0.5 ohms ($R_{CABLE}$=0.5 ohms) and that the low voltage shut off of the battery charge controller 30 is 4.53 VDC. The battery charge controller 30 will endeavour to draw as much current as needed to charge the battery 32, which, in the case of a USB bus, will be limited to about 0.5 A. Thus, the voltage arriving at the battery charge controller, $V_{CHRG}$, will be:

$$V_{CHRG} = V_{BUS} - R_{CABLE} \times I_{CABLE} \quad (1)$$
$$= 4.75 \ VDC - (0.5 \ ohms \times 0.5 \ A)$$
$$= 4.5 \ VDC$$

If the low voltage shutdown of the battery charge controller is higher than $V_{CHRG}$=4.5 VDC, it will therefore shutdown. This is the case for the LTC1734 controller, for example, which shuts down at 4.53 VDC.

The above calculations did not even take into account component tolerances, which cannot be ignored. The LTC1734 application notes state that this device has a tolerance of 1%. If the current regulator 34 incorporates a number of simple components then the circuit of FIG. 3 may easily have a tolerance of 3% or so. Thus, $V_{CHRG}$ may effectively be in the range of 4.37 VDC; well below the 4.53 VDC cut off for the LTC1734 battery charge controller.

Equation (1) can also be used to determine a current level, $I_{CABLE}$, which does not cause the battery charge controller 30 to shutdown:

$$V_{CHRG} = V_{BUS} - R_{CABLE} \times I_{CABLE} \quad (1)$$

$$I_{CABLE} = (V_{BUS} - V_{CHRG}) / R_{CABLE} \quad (2)$$
$$= (4.75 - 4.53)/0.5$$
$$= 0.44 \ A$$

Thus, reducing the current $I_{CABLE}$ to 0.44 A is sufficient to avoid the low voltage shut off of the battery charge controller 30. Allowing for 3% tolerance:

$$I_{CABLE} = (V_{BUS} - V_{CHRG} \times 3\%) / R_{CABLE} \quad (2)$$
$$= (4.75 - 4.53 \times 1.03)/0.5$$
$$= (0.09)/0.5$$
$$= 0.18 \ A$$

That is, the current $I_{CABLE}$ may have to be reduced to 0.18 A to avoid the low voltage shutdown.

Thus, the use of the circuit in FIG. 3 allows computer data buses and similar power supplies with limited capacity, to be used to charge mobile devices, without causing the battery charge controller 30 to shut down.

The solution of this embodiment adapts to the capabilities of any external power source to minimize charge time. If, for example, 5 VDC arrives at the input of the battery charge controller 30 with unlimited current and no voltage drop as the current draw increases, then the regulating circuit 34 will not restrict the current drawn.

A number of different embodiments will now be described. Each embodiment uses a very small number of simple, reliable components. Thus, as a whole, the invention provides an effective solution which is inexpensive, reliable and consumes minimal board space in a portable device.

Comparator Embodiment

Figure 4:
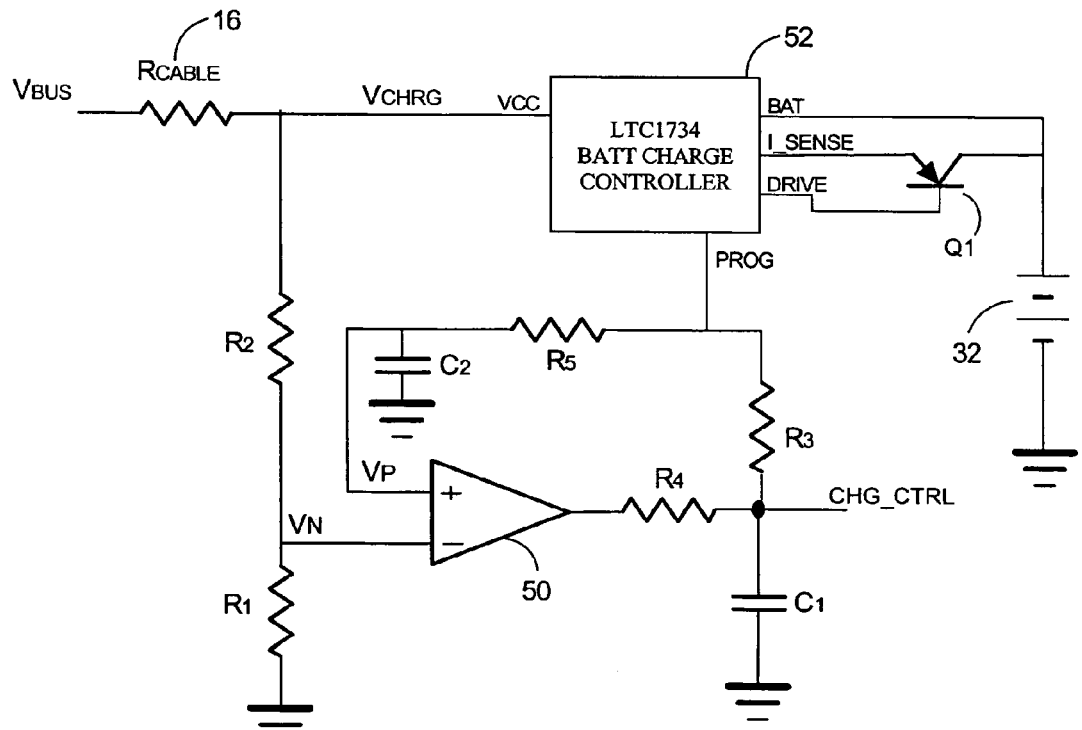
FIG. 4 presents an electrical schematic diagram of a battery charging circuit using a comparator, in an embodiment of the invention.

FIG. 4 presents an electrical schematic diagram charging circuit which employs two main components: a comparator 50 and a LTC1734 battery charge controller 52 having a current control pin PROG. Varying the current drawn through the control pin PROG will vary the current supplied by the LTC1734 battery charge controller 52 to the battery 32. Drawing more current out of the PROG pin will increase the charge current, while reducing the PROG current will reduce the charge current.

Many battery charge controllers have a similar current control system, but this embodiment will be described with respect to the LTC1734 controller. The LTC1734 controller can be operated in either constant current mode, or constant voltage mode.

In the constant voltage mode (entered when the charge voltage of the battery 32 reaches 4.2 VDC externally), the LTC1734 controller 52 servos its DRIVE pin to maintain its BAT pin at 4.2 VDC. In this mode, the current provided by the LTC1734 controller 52 will necessarily drop, and the current flowing out of the PROG pin will drop accordingly. As this latter mode of operation is not affected by the system described herein, it will not be discussed in any further detail.

As noted above, the minimum required voltage at VCC for proper operation of the LTC1734 controller 52 is 4.53 VDC, and the USB specification states that for standard USB equipment under a high load (i.e. 500 mA), $V_{CHRG}$ may be pulled as low as 4.35V—too low for the LTC1734 controller 52 to operate. To prevent this, the comparator 50 monitors $V_{CHRG}$ (scaled down to a more useful voltage—$V_N$—by the voltage divider R1 and R2) fed to the inverting input of the comparator 50 and compares it to a reference voltage ($V_P$) which is fed to the comparator 50's non-inverting input.

$V_P$ is derived by low-pass filtering the LTC1734 controller 52's PROG pin output through resistor R5 and capacitor C2, as $V_{PROG}$=1.5 VDC when the LTC1734 controller 52 is operating in the constant-current mode. R5 also serves to isolate other components from the LTC1734 controller 52, ensuring proper operation of the LTC1734 controller 52. Resistors R1 and R2 are chosen such that $V_{CHRG}$ is a suitable tolerance above 4.53 VDC when $V_N$=1.5 VDC.

In the intended and published usage of the LTC1734 controller 52, the voltage across resistor R3 is $V_{PROG}$ since R3 is intended to be tied between PROG and ground. In such a configuration, determining and setting a fixed charge current ICHRG, is straightforward. In the system of the invention, rather than adjusting R3 to control charge current as most alternative ideas suggest, this circuit adjusts the voltage across a fixed R3 by changing the voltage across C1 (that is, $V_{C1}$) such that:

$$I_{CHG} = \frac{1.5V - V_{C1}}{R3} \times 1000$$

$V_{C1}$ is controlled by the comparator 50. As the comparator 50 is an open-drain comparator (a MAX9120 comparator was used for testing purposes, though similar parts such as the LMV7235 should work as well), when $V_N > V_P$, the comparator 50 will sink current into its output pin; otherwise the output pin will float.

The control loop operates as follows:
1. as $I_{CHRG}$ drops, the voltage drop across the cable and connectors 16 also drops, so $V_{CHRG}$ rises, per equation (1) above. As $V_{CHRG}$ rises, the positive input to the comparator 50, $V_N$, will also rise. For $V_N$ rising, when $V_N > V_P + 0.5\ V_{HYS}$ ($V_{HYS}$ being the input hysteresis for the comparator 50), the comparator 50 will turn on its output and pull charge out of C1, decreasing $V_{C1}$ and causing $I_{CHRG}$ to increase;
2. as $I_{CHRG}$ increases, the voltage drop across the cable and connectors 16 rises, causing $V_{CHRG}$, and consequently $V_N$, to drop. For $V_N$ falling, when $V_N < V_P - 0.5\ V_{HYS}$, the comparator 50 turns off its output, allowing the LTC1734 controller 52's PROG pin to pour charge into C1, causing $V_{C1}$ to increase and decreasing $I_{CHRG}$.

Resistor R4 smooths out the ripples on C1 and limits current transients through the comparator 50's output.

When the power supply is capable of supplying all the power the LTC1734 controller 52 can handle, $V_{C1}$ will be at a minimum and $I_{CHG}$ will be approximately determined by:

$$I_{CHG} = \frac{1.5V}{R3 + R4 + R_{OUT}} \quad (4)$$

$R_{OUT}$ is the resistance from the comparator 50's output to GND when the output is active. Because the LTC1734 controller 52 is susceptible to malfunction due to capacitive effects in the PROG circuit, it is best to keep $R4 \leq 0.1R3$, but this will depend on the application, and can easily be determined by one skilled in the art.

When power is first applied to this circuit through $V_{BUS}$, $V_{C1}=0$ and the charger will start and stay on. A high-on-reset signal of 3.0V applied to CHG_CTRL will keep the charger off; once the "off" state has been established, the CHG_CTRL signal can be removed. Conversely, pulling CHG_CTRL to GND for a period of time and then floating it will turn on the charger.

Testing of Comparator Embodiment

The circuit of FIG. 4 was tested with the following component values:
R1=10.0 kΩ
R2=21.0 kΩ
R3=3.09 kΩ
R4=200Ω
R5=10.0 kΩ
C1=1 μF
C2=0.1 μF The R4, C1 time constant was chosen to be at least 10 times larger than the propagation delay of the MAX9120 for stability.

For testing purposes, a 1Ω resistor was used to simulate the resistance of the supply cable and connectors 16.

With $V_{BUS}$=6 VDC, $I_{CHRG}$=440 mA.

As $V_{BUS}$ was gradually reduced, $I_{CHRG}$ remained at 440 mA until $V_{BUS}$=5.075 VDC, at which point $I_{CHRG}$ started to drop. By the time $V_{BUS}$=4.71 VDC, the charge current $I_{CHRG}$, had dropped to 92 mA.

Using an HP54645D oscilloscope to probe the LTC1734 controller 52's VCC pin showed the following:
for $I_{CHRG}$=440 mA and $V_{BUS}$=5.075 VDC, VCC=4.63 VDC; and
for $I_{CHRG}$=92 mA and $V_{BUS}$=4.71 VDC, VCC=4.63 VDC.

This is consistent with the chosen values of R1 and R2, using the PROG reference scheme.

With $V_{BUS}$=4.63 VDC, the LTC1734 controller 52 turned off and $V_{PROG}$=4.625 VDC.

By returning $V_{BUS}$ to 6 VDC, the LTC1734 controller 52 could be turned on again by momentarily pulling CHG_CTRL to GND. Similarly, pulling CHG_CTRL above about 2.25 VDC turned the LTC1734 controller 52 back off.

Digital Potentiometer Embodiment

The invention is not strictly limited to the case where the low voltage threshold is never exceeded. In the embodiment of FIGS. 5 and 6, for example, the low voltage threshold could be exceeded with each periodic cycle of current ramping, but the duty cycle still be sufficient to charge the battery. The only difficulty with such a circuit is that is would be necessary to reset the battery charge controller with each cycle. The circuit of FIGS. 5 and 6 ramps through a range of current supply, but uses a reset circuit to stop the ramping before the low voltage threshold is exceeded.

Like the embodiment of FIG. 4, this circuit uses the LTC1734 battery charge controller 52, though other battery charge controllers having a current control pin PROG could also be used. However, rather than having a comparator circuit as in FIG. 4 which modulates the current draw to avoid the low voltage shut off, this circuit ramps from a low current level, through to a high current level. Before the low voltage threshold is reached, the LTC1734 controller 52 shuts down and the cycle is repeated. The circuit also includes provisions for setting the current draw to a number of predetermined and fixed levels.

Looking first at the simplest case, with the inputs FAST CH, HI/LO CH and ADJUST all at 0 VDC, then there will be no current flow through either of the semiconductors Q2 or Q3. The resistance between PROG and ground will therefore be equal to the sum of resistors R6 and R7, and this will determine the current flow through the LTC1734 controller 52. If these resistors are set to 2.2 kohms and 12.8 kohms respectively, then the circuit will provide 100 mA.

If the FAST CH is held high, then current will flow through R6, and the resistance from PROG to ground will only be 2.2 kohms. Thus, the current flow through the LTC1734 controller 52 will be approximately 750 mA. This setting would not be useful with a low capacity supply such as a USB port, but could be used with a high capacity supply such as an AC transformer.

Finally, with the HI/LO CH input high, current will flow through resistor R8, electronic potentiometer R9, and Q2. Resistor R8 preferably has a value of 1 kohm, and R9 is preferably a MAX5467 potentiometer, which has a range of 0–10 kohms, in 32 discrete steps. Thus, this circuit will step through a resistance of 11 kohms down to 1 kohm in 32 discrete steps (note that this circuit is in parallel to R7, so R7 must be considered in determined the current drawn from PROG). This would result in the current output similar to that shown in FIG. 6 (the number of steps that would actually be made prior to reaching the low voltage shut off varies with the particular application due to component values and tolerances, and other factors).

The ADJUST and HI/LO CH inputs could be controlled using a microcontroller or similar device. As well, hardware components such as an oscillator could also be used to control the rate through which the steps of potentiometer are stepped.

In the preferred embodiment of the invention, the HI/LO CH input also feeds the CS pin on the MAX5467. This is a "chip select" input—in combination with U/D input fed by the ADJUST input, it is used to increment or decrement the electronic potentiometer R9. Also, a separate reset circuit is provided using resistors R10, R11, R12, capacitor C3, and transistor Q3. This circuit could be powered using any reliable voltage V2 (in the preferred embodiment, V2=+3.3 VDC, which is provided from $V_{USB}$ and a voltage regulator).

The preferred values for the components in this circuit are:
R6=2.2 kohms
R7=4–12.8 kohms
R8=1.0 kohms
R9=10 kohms
R10=200.0 kohms
R11=10.0 kohms
R12=200 kohms
C3=22 pF Software Embodiments Rather than using only electronic hardware as shown above, the invention may also be implemented using a combination a hardware and software components, including programmable devices such as digital signal processors (DSPs), microcontrollers, field programmable gate arrays (FPGAs), application specific integrated circuits (ASICs) and the like. Such an embodiment could be implemented as shown in the flow chart of FIG. 7.

Like the embodiments described above, this method could be used to charge any rechargeable battery in a portable or similar electronic device. Any external power supply could be used, though the invention is most useful with power supplies of limited capacity. The method of the invention adjusts to the parameters of external power supplies to minimize charge time.

Figure 7:
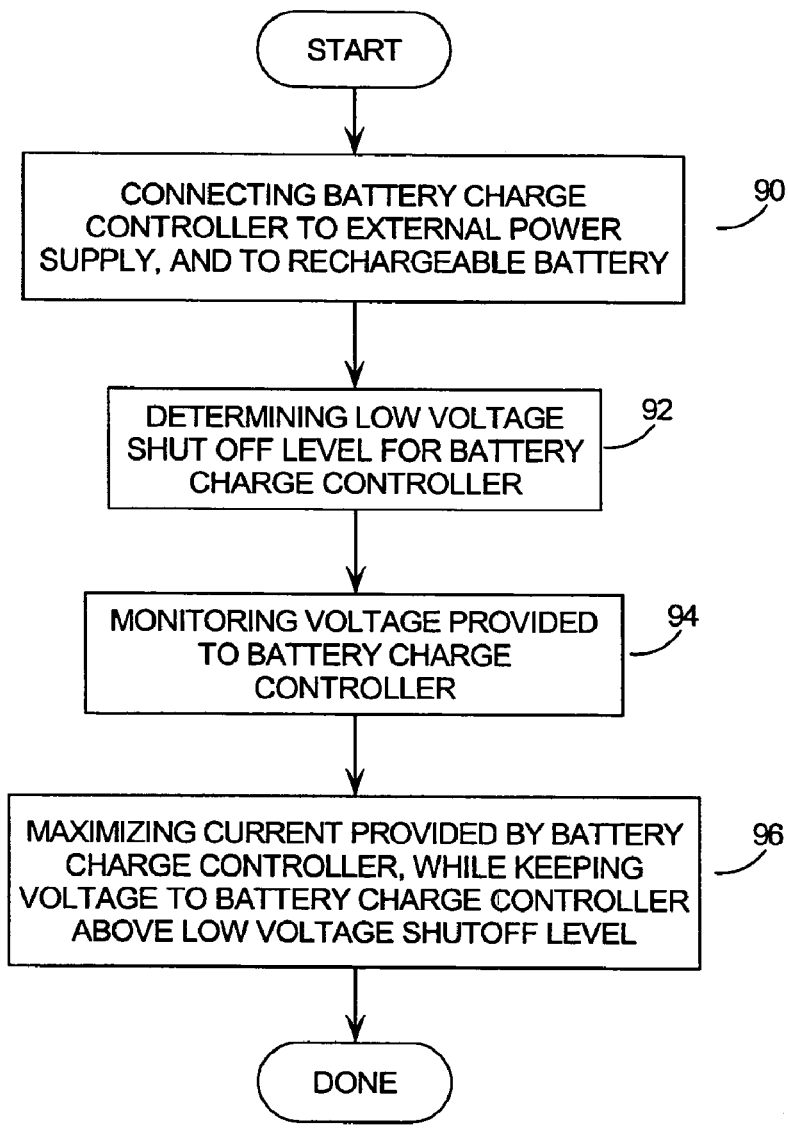
FIG. 7 presents a flow diagram of an example method for charging a battery in a mobile device.

As shown in FIG. 7, the method of the invention begins at step 90 by connecting a battery charge controller 30 to the external power supply and to the rechargeable battery in the portable device 18. As described herein above, the connection to the external power supply is preferably made via a USB cable and connectors 16, and a cradle 10 to hold the portable device 18.

A low voltage shut off level for the battery charge controller in the portable device 18 is then determined at step 92. This low voltage shut off level is generally predetermined as the software algorithm is executed by the portable device 18, and the parameters of the battery charge controller 30 being used in the portable device 18 can be programmed into it.

The voltage provided by the external power supply to the battery charge controller 30 is then monitored at step 94. This step could be provided periodically, continuously, or in response to an event, such as a change in the charge current. Various devices, such as microcontrollers, are often provided with integral ADCs (analogue to digital converters) which could be used to perform this monitoring function.

The current drawn by the battery charge controller 30 is then maximized at step 96, with the limitation that the voltage being supplied to the battery charge controller 30 must be kept above the low voltage shut off level. The current drawn by the battery charge controller 30 could be controlled in a number of manners. For example, most microcontrollers have DAC (digital to analogue converter) outputs which could be used to control the current provided by a device such as the LTC1734 controller 52, described herein above.

The balance of the software code needed to perform this algorithm would be straightforward to one skilled in the art.

The method steps of the invention may be embodiment in sets of executable machine code stored in a variety of formats such as object code or source code, integrated with the code of other programs, implemented as subroutines, by external program calls or by other techniques as known in the art.

Even the hardware embodiments of the invention could be encoded in a software form such as the hardware development languages (HDL code) used to fabricate integrated circuits. This HDL or similar code could be stored on any electronic memory means such computer diskettes, CD-Roms, Random Access Memory (RAM) and Read Only Memory (ROM). As well, electronic signals representing this software code may also be transmitted via a communication network.

Options and Alternatives

While particular embodiments of the present invention have been shown and described, it is clear that changes and modifications may be made to such embodiments without departing from the true scope and spirit of the invention. For example:

1. the circuit of the invention could be used with any manner of power source including: conventional AC power supplies (often referred to as "bricks"), computer data busses such as USB ports, external battery packs, laptop power supplies, DC outlets on aircraft;
2. any manner of electrical appliance could be charged with such a circuit including portable laptop computers, personal digital assistants (PDAs), cellular telephones, wireless email and paging devices; and
3. any manner of rechargeable battery could be used including single or multiple lithium-ion, nickel-cadmium, or other types of cells.

Again, such implementations would be clear to one skilled in the art from the teachings herein, and do not take away from the invention.

What is claimed is:
1. A portable communication device, comprising:
a rechargeable battery; and
a battery charging circuit coupled to the rechargeable battery and configured to receive power from an external power source and use the power from the external power source to charge the rechargeable battery, the battery charging circuit including:
a battery charge controller configured to receive an input voltage form the external power source and use the input voltage to charge the rechargeable battery, the battery charge controller requiring that the input voltage remain above a low voltage threshold when charging the rechargeable battery, the battery charge controller having a current control input; and
a regulating circuit configured to regulate the input voltage to maintain the input voltage above the low voltage threshold, said regulating circuit being operable to respond to deviations in the input voltage by adjusting a current drawn by the battery charge controller to maintain the input voltage above the low voltage threshold.

2. The portable communication device of claim 1, wherein the regulating circuit is operable to maximize a current drawn by the battery charging circuit from the external power source.

3. The portable communication device of claim 1, wherein the regulating circuit includes:
a comparator circuit configured to receive a voltage signal from the input voltage and a reference voltage signal, and to control the current drawn by the battery charging circuit based on a difference between the voltage signal and the reference voltage signal.

4. The portable communication device of claim 1, wherein the regulating circuit includes:
  an electronic potentiometer configured to vary a resistance in response to a control signal from a microprocessor in the portable communication device, wherein the resistance is varied to increase or decrease the current drawn by the battery charging circuit.

5. The portable communication device of claim 4, wherein the electronic potentiometer incrementally decreases the resistance in response to control pulses from the microprocessor, thereby incrementally increasing the current drawn by the battery charging circuit.

6. The portable communication device of claim 4, wherein the electronic potentiometer is configured to cyclically ramp the resistance through a range of resistances, thereby cycling the current drawn by the battery charging circuit through a range of about 0 Amps to a current level that results in an input voltage at the low voltage threshold.

7. The portable communication device of claim 3, wherein the reference voltage signal is provided by the battery charge controller.

8. The portable communication device of claim 3, wherein the comparator circuit includes a voltage divider circuit for generating the voltage signal from the input voltage.

9. The portable communication device of claim 3, wherein the regulating circuit includes a capacitor coupled between the comparator circuit and a ground potential and operable to smooth variances in an output of the comparator circuit.

10. The portable communication device of claim 1, wherein the external power source includes a computer bus having a power node.

11. The portable communication device of claim 10, wherein the computer data bus is a universal serial bus (USB).

12. The portable communication device of claim 3, wherein the comparator circuit has a hysteresis, wherein the battery charge controller will not charge the rechargeable battery until the input voltage is a set amount above the low voltage threshold.

13. The portable communication device of claim 3, wherein the comparator circuit is configured to decrease the current drawn by the battery charging circuit when the input voltage drops below a preset reference level.

14. The portable communication device of claim 3, wherein:
  the battery charge controller includes a low voltage shut-off circuit, the low voltage shut-off circuit being configured to cause the battery charge controller to stop charging the rechargeable battery if the input voltage falls below the low voltage threshold; and
  the regulating circuit being configured to lower a current output of the battery charge controller if the input voltage falls below a preset limit, the preset limit being above the low voltage threshold.

15. A portable communication device, comprising:
  a rechargeable battery:
  means for connecting the portable communication device to an external power source;
  means for charging the rechargeable battery using an input voltage from the external power source; and
  means for maintaining the input voltage above a low voltage shut-off level below which the portable communication device stops charging the rechargeable battery by adjusting a current drawn by the means for charging in response to deviations in the input voltage.

* * * * *